United States Patent
Iwai et al.

(10) Patent No.: US 11,077,407 B2
(45) Date of Patent: *Aug. 3, 2021

(54) POROUS HOLLOW-FIBER MEMBRANE AND PRODUCTION PROCESS THEREFOR

(71) Applicant: TORAY INDUSTRIES, INC., Tokyo (JP)

(72) Inventors: Kenta Iwai, Shiga (JP); Masayuki Hanakawa, Shiga (JP); Tamotsu Kitade, Shiga (JP); Masahiro Kimura, Shiga (JP); Toshiyuki Ishizaki, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 366 days.

This patent is subject to a terminal disclaimer.

(21) Appl. No.: 16/305,757

(22) PCT Filed: May 30, 2017

(86) PCT No.: PCT/JP2017/020161
§ 371 (c)(1),
(2) Date: Nov. 29, 2018

(87) PCT Pub. No.: WO2017/209151
PCT Pub. Date: Dec. 7, 2017

(65) Prior Publication Data
US 2020/0246756 A1 Aug. 6, 2020

(30) Foreign Application Priority Data

May 31, 2016 (JP) .............................. JP2016-108319

(51) Int. Cl.
*B01D 69/02* (2006.01)
*B01D 69/08* (2006.01)
(Continued)

(52) U.S. Cl.
CPC ......... *B01D 69/02* (2013.01); *B01D 67/0018* (2013.01); *B01D 67/0027* (2013.01);
(Continued)

(58) Field of Classification Search
CPC ............... B01D 69/02; B01D 67/0018; B01D 67/0027; B01D 69/087; B01D 71/34;
(Continued)

(56) References Cited

U.S. PATENT DOCUMENTS 5,277,851 A 1/1994 Ford et al.
5,318,417 A 6/1994 Kopp et al.
(Continued)

FOREIGN PATENT DOCUMENTS

CN 1043636 A 7/1990
CN 1621138 A 6/2005
(Continued)

OTHER PUBLICATIONS

Kim, T.H., Jee, K.Y. & Lee, Y.T. The improvement of water flux and mechanical strength of PVDF hollow fiber membranes by stretching and annealing conditions. Macromol. Res. 23, 592-600 (2015). https://doi.org/10.1007/s13233-015-3087-0 (Year: 2015).*

(Continued)

*Primary Examiner* — Bradley R Spies
*Assistant Examiner* — Jeannie McDermott
(74) *Attorney, Agent, or Firm* — Birch, Stewart, Kolasch & Birch, LLP

(57) ABSTRACT

The porous hollow-fiber membrane of the present invention comprises a fluororesin polymer, and has columnar structures oriented in the longitudinal direction thereof. In the porous hollow-fiber membrane, molecular chains of the fluororesin polymer have been oriented in the longitudinal (Continued)

direction of the porous hollow-fiber membrane and have an average value v of Raman orientation parameter of 1.5-4.0.

10 Claims, 1 Drawing Sheet

(51) Int. Cl.
  *B01D 71/34* (2006.01)
  *C08J 9/26* (2006.01)
  *B01D 67/00* (2006.01)
  *C02F 1/44* (2006.01)
  *C02F 103/08* (2006.01)

(52) U.S. Cl.
  CPC .......... *B01D 69/087* (2013.01); *B01D 71/34* (2013.01); *C08J 9/26* (2013.01); *B01D 2325/02* (2013.01); *B01D 2325/20* (2013.01); *B01D 2325/24* (2013.01); *B01D 2325/30* (2013.01); *B01D 2325/34* (2013.01); *C02F 1/44* (2013.01); *C02F 2103/08* (2013.01)

(58) Field of Classification Search
  CPC .......... B01D 2325/02; B01D 2325/20; B01D 2325/24; B01D 2325/30; B01D 2325/34; B01D 69/08; B01D 65/08; B01D 67/0016; B01D 71/32; C08J 9/26; C02F 1/44; C02F 2103/08; D01F 6/12
  See application file for complete search history.

(56) References Cited

U.S. PATENT DOCUMENTS

| | | | |
|---|---|---|---|
| 5,395,570 A | 3/1995 | Kopp et al. | |
| 5,489,406 A | 2/1996 | Beck et al. | |
| 5,698,101 A | 12/1997 | Kopp et al. | |
| 2004/0135274 A1 | 7/2004 | Matsuda et al. | |
| 2006/0178480 A1 | 8/2006 | Tada et al. | |
| 2009/0206035 A1* | 8/2009 | Takahashi | B01D 69/02 210/636 |
| 2011/0290716 A1 | 12/2011 | Tada et al. | |
| 2012/0160764 A1 | 6/2012 | Tada et al. | |
| 2016/0121273 A1 | 5/2016 | Ishiodori et al. | |
| 2017/0348849 A1 | 12/2017 | Hanakawa et al. | |

FOREIGN PATENT DOCUMENTS

| | | |
|---|---|---|
| CN | 1621139 A | 6/2005 |
| CN | 1759142 A | 4/2006 |
| CN | 102548647 A | 7/2012 |
| CN | 103432916 B | 4/2015 |
| CN | 105392553 A | 3/2016 |
| CN | 107106998 A | 8/2017 |
| EP | 3238814 A1 | 11/2017 |
| EP | 3 398 674 A1 | 11/2018 |
| JP | 2000-192327 A | 7/2000 |
| JP | 2006-281202 A | 10/2006 |
| JP | 2008-297383 A | 11/2006 |
| JP | 2007-181813 A | 7/2007 |
| JP | 2008-105016 A | 5/2008 |
| JP | 2012-40521 A | 3/2012 |
| KR | 10-2016-0015439 A | 2/2016 |
| WO | WO 2004/081109 A1 | 9/2004 |
| WO | WO 2009/110397 A1 | 9/2009 |
| WO | WO 2016/104743 A1 | 6/2016 |

OTHER PUBLICATIONS

Jeong F. Kim, et.al. Microporous PVDF membranes via thermally induced phase separation (TIPS) and stretching methods, Journal of Membrane Science, vol. 509, 2016,pp. 94-104, https://doi.org/10.1016/j.memsci.2016.02.050. (Year: 2016).*
Cui, Zhaoliang, et.al. Crystalline polymorphism in poly(vinylidenefluoride) membranes, Progress in Polymer Science, vol. 51, 2015, pp. 94-126, https://doi.org/10.1016/j.progpolymsci.2015.07.007. (Year: 2015).*
European Search Report, dated Jan. 23, 2020, for European Application No. 17806704.7.
Chinese Office Action and Search Report for Chinese Application No. 201780032422.9, dated Oct. 16, 2020, with an English translation.
Korean Notice of Preliminary Rejection for Korean Application No. 10-2013-7034154, dated Dec. 8, 2020, with an English translation.
Chinese Office Action and Search Report for Chinese Application No. 201780032422.9, dated Mar. 3, 2021, with English translation.
European Office Action issued in Application No. 17806704.7 dated Mar. 26, 2021.
International Search Report, issued in PCT/JP2017/020161, dated Aug. 29, 2017.
Written Opinion of the International Searching Authority, issued in PCT/JP2017/020161, dated Aug. 29, 2017.

* cited by examiner

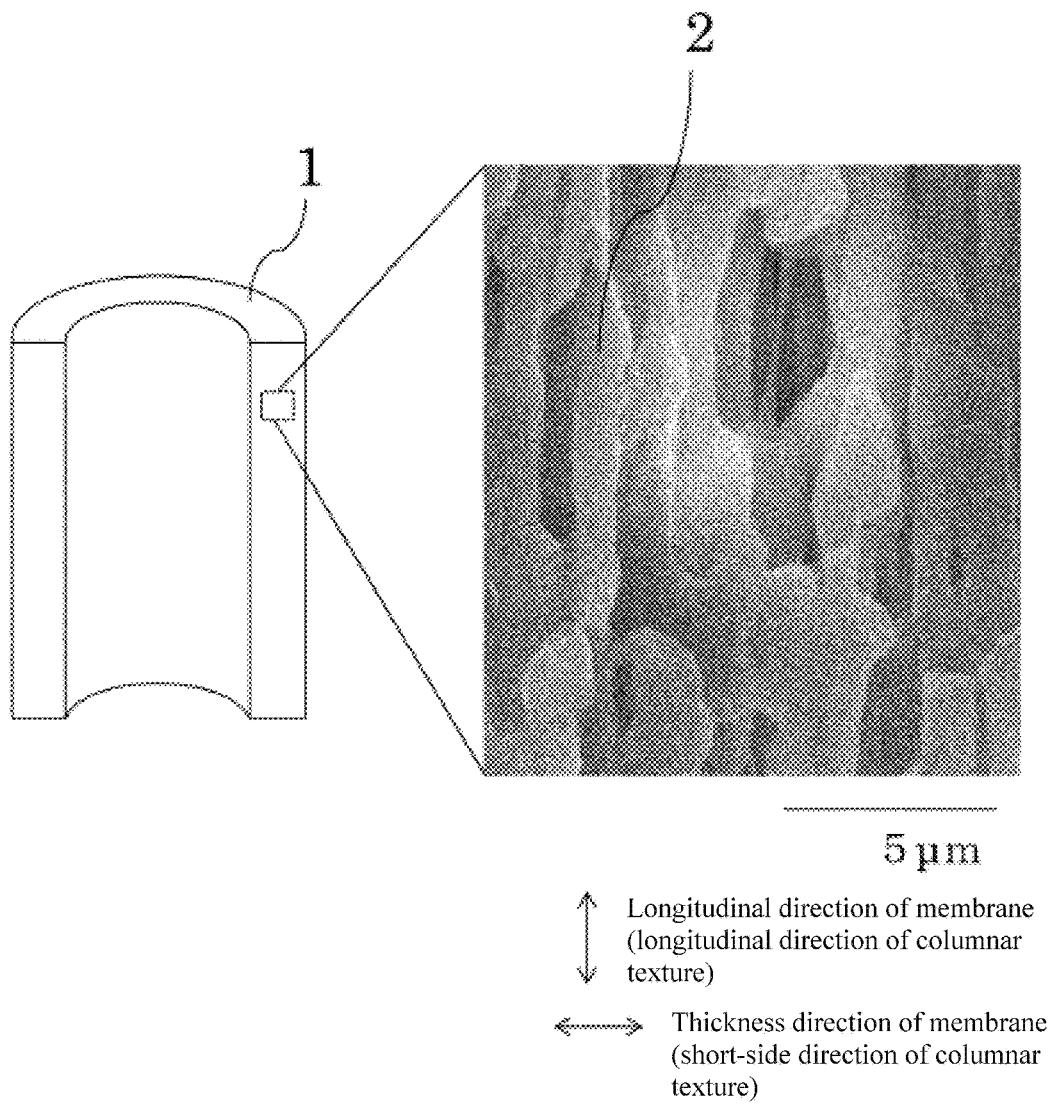

POROUS HOLLOW-FIBER MEMBRANE AND PRODUCTION PROCESS THEREFOR

TECHNICAL FIELD

The present invention relates to a porous hollow-fiber membrane suitable for various water treatments such as drinking water production, industrial water production, water purification treatment, wastewater treatment, seawater desalination and industrial water production, and a production method thereof.

BACKGROUND ART

In recent years, a porous membrane is utilized in a variety of areas, for example, a water treatment field such as water purification treatment and wastewater treatment, a medical and pharmaceutical application such as blood purification, a food industry field, a battery separator, a charged membrane, and an electrolyte membrane for fuel cells.

As the porous membrane for water treatment, one corresponding to the size of a separation target substance contained in water to be treated is used. Usually, natural water contains many suspended solid components and therefore, a microfiltration membrane or ultrafiltration membrane for removing suspended solid components in water is used in general.

In the water purification treatment field, a problem of a chlorine-resistant pathogenic microorganism such as cryptosporidium mixed in with drinking water has been manifested since late 20th century, and high strength enough to prevent raw water from getting mixed in due to membrane breakage is required for the porous hollow-fiber membrane.

For example, in Patent Document 1, a fibrous texture having a diameter of 0.9 to 3 μm and being oriented in the length direction of a porous hollow-fiber membrane composed of a fluororesin-based polymer accounts for 30% or more of the entire porous hollow-fiber membrane, and a porous hollow-fiber membrane excellent in strength and pure-water permeation performance is thereby obtained.

Furthermore, in Patent Document 2, it is stated that:
a plasticizer and a good solvent for vinylidene fluoride resin are added to a vinylidene fluoride resin, the obtained composition is extruded into a film form, the extrudate is cooled preferentially from one surface to cause solidification and film formation, the plasticizer is extracted, and the film is further stretched to form a porous membrane; and
in the porous membrane, a crystalline oriented portion and a crystalline non-oriented portion (randomly oriented portion) are recognized by X-ray diffraction.

BACKGROUND ART DOCUMENT

Patent Document

Patent Document 1: JP-A-2006-297383
Patent Document 2: WO 2004/081109

SUMMARY OF THE INVENTION

Problems that the Invention is to Solve

In the case of filtering various liquids to be treated by using a porous hollow-fiber membrane, an air scrubbing operation of vibrating and cleaning the hollow-fiber membrane is performed for the purpose of suppressing membrane contamination (fouling) with suspended solid components contained in the liquid to be treated and therefore, in addition to high strength not to cause fiber breakage, high toughness allowing to exhibit good membrane shaking without causing buckling is also required for the hollow-fiber membrane.

An object of the present invention is to provide a porous hollow-fiber membrane having high strength and toughness while maintaining high pure-water permeation performance.

Means for Solving the Problems

The present invention employs any one constitution of the following [1] to [11].

[1] A porous hollow-fiber membrane containing a fluororesin-based polymer, in which
the porous hollow-fiber membrane has a columnar texture oriented in a longitudinal direction thereof,
a molecular chain in the columnar texture is oriented in the longitudinal direction of the porous hollow-fiber membrane, and
the molecular chain has an average value ν of a Raman orientation parameter being from 1.5 to 4.0:

$$\text{Raman orientation parameter} = (I1270/I840)\text{parallel}/(I1270/I840)\text{perpendicular} \quad (1),$$

(in which
parallel condition: the longitudinal direction of the porous hollow-fiber membrane is parallel to a polarization direction;
perpendicular condition: the longitudinal direction of the porous hollow-fiber membrane is orthogonal to the polarization direction;
I1270 parallel: the intensity of Raman band at 1,270 $cm^{-1}$ under the parallel condition;
I1270 perpendicular: the intensity of Raman band at 1,270 $cm^{-1}$ under the perpendicular condition;
I840 parallel: the intensity of Raman band at 840 $cm^{-1}$ under the parallel condition; and
I840 perpendicular: the intensity of Raman band at 840 $cm^{-1}$ under the perpendicular condition).

[2] The porous hollow-fiber membrane according to [1] above, in which the columnar texture has a short-side length of from 0.5 to 3 μm and an aspect ratio of 3 or more.

[3] The porous hollow-fiber membrane according to [1] or [2] above, in which a thickness uniformity of the columnar texture is 0.50 or more.

[4] The porous hollow-fiber membrane according to any one of [1] to [3] above, in which the molecular chain in the columnar texture has a ratio M/m of a maximum Raman orientation parameter M to a minimum Raman orientation parameter m being from 1.5 to 4.0.

[5] The porous hollow-fiber membrane according to any one of [1] to [4] above, having a maximum Raman orientation parameter M of the molecular chain in the columnar texture being 4.0 or less.

[6] The porous hollow-fiber membrane according to any one of [1] to [5] above, having a porosity being from 40 to 80%.

[7] The porous hollow-fiber membrane according to any one of [1] to [6] above, having a pure-water permeation performance at 50 kPa and 25° C. being 0.7 $m^3/m^2$/hr or more, a breaking strength being 23 MPa or more, and a Young's modulus being from 0.15 to 0.40 GPa.

[8] The porous hollow-fiber membrane according to any one of [1] to [7] above, in which the molecular chain of the fluororesin-based polymer has an orientation degree π in the longitudinal direction of the porous hollow-fiber membrane, calculated based on the following formula (2), being less than 0.4, or the molecular chain of the fluororesin-based polymer is non-oriented:

$$\text{Orientation degree } \pi = (180° - H)/180° \quad (2),$$

(in which H is a half-width (°) of a diffraction intensity distribution in a circumferential direction of a wide-angle X-ray diffraction image).

[9] A method for producing a porous hollow-fiber membrane, including the following steps 1) and 2):

1) a step of forming a porous hollow fiber having a columnar texture from a membrane-forming solution containing a fluororesin-based polymer by thermally induced phase separation, in which the columnar texture is oriented in a longitudinal direction and has a thickness uniformity of 0.50 or more and less than 1.00; and 2) a step of stretching the porous hollow fiber obtained in 1) above to 1.8 to 2.4 times in the longitudinal direction at a rate of 1 to 150%/s.

[10] The method for producing a porous hollow-fiber membrane according to [9] above, in which the thermally induced phase separation of the step 1) includes at least one cooling step of the following a) and b):

a) a step of soaking the membrane-forming solution in a cooling bath at a temperature Tb satisfying Tc–30° C.<Tb≤Tc; and b) a step of soaking the membrane-forming solution in a cooling bath at a temperature Tb1 satisfying Tb1≤Tc–30° C., followed by soaking in a cooling bath at a temperature Tb2 satisfying Tc–30° C.<Tb2≤Tc, in which Tc is a crystallization temperature of the membrane-forming solution containing the fluororesin-based polymer).

Advantageous Effects of the Invention

According to the present invention, the Raman orientation parameter ν of the columnar texture is in the range above, and thereby a porous hollow-fiber membrane having all of high pure-water permeation performance, high strength and high toughness and at the same time, having excellent chemical durability owing to a fluororesin-based polymer with high chemical resistance is provided.

BRIEF DESCRIPTION OF THE DRAWINGS

FIG. 1 is a diagram illustrating the columnar texture in the hollow-fiber membrane.

MODE FOR CARRYING OUT THE INVENTION

The porous hollow-fiber membrane according to an embodiment of the present invention is described. However, the present invention is not limited by this embodiment. In the present description, mass % and wt % have the same meaning.

1. Porous Hollow-Fiber Membrane (1-1) Fluororesin-Based Polymer

The porous hollow-fiber membrane of the present invention contains a fluororesin-based polymer.

The fluororesin-based polymer as used in the present description means a resin containing at least one of a vinylidene fluoride homopolymer and a vinylidene fluoride copolymer. The fluororesin-based polymer may contain a plurality of kinds of vinylidene fluoride copolymers.

The vinylidene fluoride copolymer is a polymer having a vinylidene fluoride residue structure and is typically a copolymer of a vinylidene fluoride monomer and other fluorine-based monomer, etc. Such a copolymer includes, for example, a copolymer of vinylidene fluoride and one or more kinds of monomers selected from vinyl fluoride, tetrafluoroethylene, hexafluoropropylene and chlorotrifluoroethylene.

In addition, a monomer other than the above-described fluorine-based monomer, such as ethylene, may be copolymerized to the extent not impairing the effects of the present invention.

The weight average molecular weight of the fluororesin-based polymer may be appropriately selected according to the strength and water permeation performance required for the polymer separation membrane, but as the weight average molecular weight is larger, the water permeation performance is reduced, and as the weight average molecular weight is smaller, the strength is reduced. For this reason, the weight average molecular weight is preferably from 50,000 to 1,000,000. In the case of a water treatment application where the polymer separation membrane is subject to chemical cleaning, the weight average molecular weight is preferably from 100,000 to 700,000, more preferably from 150,000 to 600,000.

The porous hollow-fiber membrane preferably contains the fluororesin-based polymer as a main component, and the proportion of the fluororesin-based polymer in the porous hollow-fiber membrane is preferably 80 wt % or more, more preferably 90 wt % or more, still more preferably 95 wt % or more. The porous hollow-fiber membrane may be composed of only the fluororesin-based polymer.

Here, the "porous hollow-fiber membrane containing the fluororesin-based polymer as a main component" can be interchanged with the "porous hollow-fiber membrane based on the fluororesin-based polymer". In the present description, other elements are also described by the phrase "X contains Y as a main component", and this can similarly be interchanged with "X is based on Y".

(1-2) Columnar Texture (a) Dimension

As illustrated in FIG. 1, the porous hollow-fiber membrane 1 has a columnar texture 2 oriented in the longitudinal direction of the porous hollow-fiber membrane 1. The "columnar texture" is a solid material having a uniform thickness and having a shape long in one direction. The aspect ratio (longitudinal length/short-side length) of the columnar texture is preferably 3 or more. In FIG. 1, the columnar structure is photographically shown and therefore, a scale is indicated, but the present invention is not limited thereto. The upper limit of the aspect ratio is not particularly limited but may be, for example, 50.

Here, the "longitudinal length" indicates a length in the longitudinal direction of the columnar texture. The "short-side length" is an average length in the short-side direction of the columnar texture.

The longitudinal length and short-side length can be measured as follows. A hollow-fiber membrane is cut along the longitudinal direction of the hollow-fiber membrane, and the obtained cross-section is observed by using a scanning electron microscope (SEM). The magnification is variable according to the length of the columnar texture and is set to a level allowing a visual field to include the entire FIGURE of each of 5, preferably 10, columnar textures over its longitudinal direction. In the case where the length in the longitudinal direction varies in one columnar texture, a maximum length in the longitudinal direction may be measured as the longitudinal length. The short-side length is determined by measuring the length in each short-side direction at a predetermined number of arbitrary measurement points in one columnar texture and calculating an average value thereof. The number of measurement points is a value obtained by dividing the longitudinal length (μm) by 1 μm (rounded down to the nearest integer). For example, when the longitudinal length of the columnar texture is 20.5 μm, the number of measurement points is 20. In this connection, when the value becomes 21 or more, the length may be measured at arbitrary 20 points.

The longitudinal length of the columnar texture is not particularly limited but is preferably 7 μm or more, more preferably 10 μm or more, still more preferably 15 μm or more. The longitudinal length of the columnar texture is, for example, preferably 50 μm or less, more preferably 40 μm or less.

In the present invention, the short-side length of the columnar texture is preferably from 0.5 to 3 μm. The short-side length is preferably in the range above, because high strength performance and high pure-water permeation performance are obtained. When the short-side length of the columnar texture is 0.5 μm or more, physical strength of the columnar texture itself is increased and therefore, high strength is obtained. When the short-side length of the columnar texture is 3 μm or less, the void among columnar textures becomes large and in turn, good pure-water permeation performance is obtained. The short-side length of the columnar texture is more preferably from 0.7 to 2.5 μm, still more preferably from 1 to 2 μm.

In the porous hollow-fiber membrane of the present invention, preferable ranges of representative value of the longitudinal length and representative value of short-side length of the columnar texture are respectively the same as the above-described preferable ranges of the longitudinal length and short-side length of each individual columnar texture. In addition, as for the effects due to each representative value being in that range, description of effects when individual columnar textures have a dimension in that range is applied.

The representative value of the longitudinal length is measured as follows. Similarly to the measurement of the longitudinal length, the longitudinal length is measured at 3 sites, preferably 5 sites, in the hollow-fiber membrane for 5, preferably 10, columnar textures per site. With respect to the obtained values of the longitudinal length, an average value is determined and can be used as the representative value of the longitudinal length of the columnar texture.

The representative value of the short-side length is determined by measuring the short-side length (calculated as an average value) as described above for columnar textures which were subject to measurement of the representative value of the longitudinal length, and calculating an average value thereof.

In the porous hollow-fiber membrane of the present invention, the representative value of the aspect ratio of the columnar texture calculated from the representative value of the longitudinal length and the representative value of the short-side length is preferably 3 or more, more preferably 5 or more, still more preferably 10 or more, yet still more preferably 20 or more.

In the present invention, it is preferred that the short-side length of the columnar texture is from 0.5 to 3 μm and the aspect ratio of the columnar texture is 3 or more.

(b) Thickness Uniformity

As described later, the porous hollow-fiber membrane of the present invention can be produced by forming a hollow fiber from a membrane-forming solution containing a polymer, and stretching the hollow fiber. For the sake of convenience, the state before stretching is referred to as "hollow fiber", and the state after stretching is referred to as "hollow-fiber membrane".

The thickness uniformity (the later-described average value D) of the columnar texture in the hollow-fiber membrane after stretching is preferably 0.50 or more, more preferably 0.60 or more, still more preferably 0.70 or more, yet still more preferably 0.80 or more. Although the thickness uniformity is 1.0 at a maximum, the columnar texture may have a thickness uniformity of less than 1.0. In the hollow-fiber membrane, the columnar texture has a high thickness uniformity in this way, i.e., a narrowed portion is little formed in the columnar texture, and the elongation of the hollow-fiber membrane is thereby increased.

When the porous hollow-fiber membrane after stretching keeps high elongation, this is advantageous in that fiber breakage is less likely to occur even a load is abruptly applied. The elongation at break of the porous hollow-fiber membrane is preferably 50% or more, more preferably 80% or more. The upper limit of the elongation at break of the porous hollow-fiber membrane is not particularly limited but is, for example, 500% in consideration of the thickness uniformity above.

The thickness uniformity is described below. As the length variation among respective short-side directions of the columnar texture is smaller, a narrowed portion is less formed in the columnar texture, resulting in high thickness uniformity, and the columnar texture comes close to an ideal column.

The thickness uniformity of the columnar texture is determined by comparing a first cross-section and a second cross-section each running in parallel to the short-side direction of the porous hollow-fiber membrane. This is specifically described below.

Firstly, a first cross-section and a second cross-section running in parallel to each other are selected. The distance between the first cross-section and the second cross-section is set to be 5 μm. In each cross-section, a portion composed of resin and a void portion are first distinguished, and the area of resin portion and the area of void portion are measured. Next, the area of a portion where when the first cross-section is projected onto the second cross-section, the portion composed of resin in the first cross-section and the portion composed of resin in the second cross-section are overlapped, namely, the overlap area, is determined. With respect to arbitrary 20 pairs of first cross-section and second cross-section in one hollow-fiber membrane, thickness uniformities A and B are determined based on the following formulae (3) and (4), respectively:

$$\text{Thickness uniformity } A = (\text{overlap area})/(\text{area of resin portion of second cross-section}) \quad (3)$$

$$\text{Thickness uniformity } B = (\text{overlap area})/(\text{area of resin portion of first cross-section}) \quad (4)$$

That is, 20 pairs of thickness uniformities A and B are obtained for one hollow-fiber membrane. A larger value means that the thickness of the columnar texture is more uniform. Then, with respect to each pair, an average value C of thickness uniformities A and B is calculated. That is, 20 average values C are obtained for one hollow-fiber membrane. With respect to these average values C, an average value D is further calculated. The average value D is the thickness uniformity of this hollow-fiber membrane.

In the case where 80% or more of 20 average values C calculated for one hollow-fiber membrane have a value of 0.50 or more, the hollow-fiber membrane can be said to have a columnar texture referred to in the present invention.

In measuring the thickness uniformity, in order to clearly distinguish the resin portion and the void portion, it is preferable to previously perform resin-embedding of the porous hollow-fiber membrane in an epoxy resin, etc. and dyeing treatment of the epoxy resin, etc. with osmium, etc. By such resin embedding/dyeing treatment, the void portion is filled with an epoxy resin, etc., and at the time of cross-sectional processing with a focused ion beam described later, the portion composed of a fluororesin-based polymer and the void portion (i.e., the epoxy resin portion) can be clearly distinguished, as a result, high observation accuracy is obtained.

Furthermore, in order to obtain the above-described first cross-section and second cross-section each running in parallel to the short-side direction of the porous hollow-fiber membrane, a scanning electron microscope (SEM) equipped with a focused ion beam (FIB) is preferably used. A face parallel to the short-side direction of the porous hollow-fiber membrane is cut out by using FIB, and FIB cutting and SEM observation are repeatedly conducted 200 times at 50 nm intervals toward the longitudinal direction of the porous hollow-fiber membrane. By such continuous cross-sectional observation, information at a depth of 10 μm can be obtained. Arbitrary first cross-section and second cross-section forming faces running in parallel to each other and being spaced 5 μm apart are selected therefrom, and the thickness uniformities can be determined by using formulae (3) and (4) described above. The observation magnification may be sufficient if it is a magnification enabling clear identification of a columnar texture and a spherical texture, and a magnification of, for example, from 1,000 to 5,000 times may be used.

(c) Composition

The columnar texture contains a fluororesin-based polymer. The columnar texture preferably contains the fluororesin-based polymer as a main component. The proportion of the fluororesin-based polymer in the columnar texture is preferably 80 wt % or more, more preferably 90 wt % or more, still more preferably 95 wt % or more. The columnar texture may be composed of only the fluororesin-based polymer.

In other words, the porous hollow-fiber membrane has a solid matter containing a fluororesin-based polymer, and at least part of the solid matter constitutes a columnar texture. All of solid matters containing a fluororesin-based polymer may constitute a columnar texture, or part thereof may have a shape not falling under a columnar texture. In the porous hollow-fiber membrane, out of solid matters containing a fluororesin-based polymer, the proportion of the solid matter constituting a columnar texture is preferably 80 wt % or more, more preferably 90 wt % or more, still more preferably 95 wt % or more.

(d) Columnar Texture in Hollow-Fiber Membrane

In the porous hollow-fiber membrane, the principal structure is preferably a columnar texture. The proportion of the columnar texture in the porous hollow-fiber membrane is preferably 80 wt % or more, more preferably 90 wt % or more, still more preferably 95 wt % or more. The porous hollow-fiber membrane may be composed of only a columnar texture.

More specifically, the porous hollow-fiber membrane preferably has, as the principal structure, a columnar texture containing a fluororesin-based polymer as a main component.

The porous hollow-fiber membrane can also be phrased as an aggregate of columnar textures.

The "oriented in the longitudinal direction" as used herein means that out of angles between the longitudinal direction of the columnar texture and the longitudinal direction of the porous hollow-fiber membrane, the acute angle is within 20°.

(1-3) Orientation of Molecular Chain (a) Raman Orientation

The orientation of the molecular chain of the present invention can be determined by orientation analysis according to Raman spectroscopy. First, a porous hollow-fiber membrane is sliced by cutting with a microtome in a cross-section along the longitudinal direction of the porous hollow-fiber membrane. The thus-obtained section is observed under an optical microscope, and laser Raman measurement is thereby performed at 1 μm intervals along the longitudinal direction of a columnar texture while checking the columnar texture. The number of measurement points in one columnar texture is a value obtained by dividing the longitudinal length (μm) of the later-described columnar texture by 1 μm (rounded down to the nearest integer). For example, when the longitudinal length of the columnar texture is 20.5 μm, the number of measurement points is 20.

Since strong Raman scattering is obtained when the vibration direction of molecular chain coincides with the polarization direction of incident light, the orientation degree can be calculated by appropriately selecting a vibration mode showing a vibration direction parallel to molecular chain and a vibration mode showing a vibration direction perpendicular to molecular chain, and determining the scattering intensity ratio therebetween. For example, in the case where the fluororesin-based polymer is a polyvinylidene fluoride homopolymer, the Raman band around 1,270 $cm^{-1}$ is assigned to a coupling mode of $CF_2$ (fluorocarbon) stretching vibration and CC (carbon-carbon) stretching vibration. The vibration direction of these vibrations is in a mode parallel to molecular chain. On the other hand, the vibration direction of the Raman band around 840 $cm^{-1}$ is perpendicular to molecular chain.

The orientation parameter can therefore be calculated according to the following formula (1). The orientation parameter shows a larger value as the orientation in the longitudinal direction of the porous hollow-fiber membrane is higher, shows a value of 1 when non-oriented, and shows a value smaller than 1 when the orientation in the short-side direction is high.

$$\text{Raman orientation parameter} = (I1270/I840)\text{parallel}/(I1270/I840)\text{perpendicular} \tag{1}$$

In formula (1), parallel condition: the longitudinal direction of the porous hollow-fiber membrane is parallel to the polarization direction, perpendicular condition: the longitudinal direction of the porous hollow-fiber membrane is orthogonal to the polarization direction, I1270 parallel: the intensity of Raman band at 1,270 cm$^{-1}$ under parallel condition, I1270 perpendicular: the intensity of Raman band at 1,270 cm$^{-1}$ under perpendicular condition, I840 parallel: the intensity of Raman band at 840 cm$^{-1}$ under parallel condition, and I840 perpendicular: the intensity of Raman band at 840 cm$^{-1}$ under perpendicular condition.

In one porous hollow-fiber membrane, 10 columnar textures different from each other, having a length of 0.5 to 1.5 times the representative value of the longitudinal length of the later-described columnar texture, are selected. With respect to each columnar texture, laser Raman measurement is performed at 1 μm intervals as described above, and the orientation parameters of respective measurement points are calculated according to formula (1). An average value of the obtained values is defined as the Raman orientation parameter ν.

In addition, an operation of selecting a largest orientation parameter and a smallest orientation parameter among the measurement points of one columnar texture is performed for 10 columnar textures different from each other. With respect to selected 10 largest orientation parameters and 10 smallest orientation parameters, respective average values are determined and defined as a maximum Raman orientation parameter M and a minimum Raman orientation parameter m.

In order to accurately obtain the Raman orientation parameter ν, maximum Raman orientation parameter M, minimum Raman orientation parameter m and the later-described ratio M/m, the measurement is preferably performed for 20 columnar textures different from each other.

In the porous hollow-fiber membrane of the present invention, the Raman orientation parameter ν of the molecular chain in the longitudinal direction of the porous hollow-fiber membrane is preferably 1.5 or more, 2.0 or more, or 2.5 or more. When the orientation parameter ν is 1.5 or more, the strength of the porous hollow-fiber membrane is increased. In addition, the Raman orientation parameter ν is preferably 4.0 or less, or 3.0 or less.

It is considered that the maximum Raman orientation parameter M and the minimum Raman orientation parameter m indicate respectively the orientation degree at a main orientation site in the columnar texture and the orientation degree in a portion working out to a force point during stretching. Accordingly, M and m may be set to appropriate ranges by taking into account a balance of performances of the obtained porous hollow-fiber membrane, such as strength, elongation and water permeability. In order to provide high toughness to the porous hollow-fiber membrane, M and m are preferably 4.0 or less, more preferably 3.5 or less, still more preferably 3.0 or less. The lower limit value is not particularly limited but is, for example, 1.1.

It is likely that as the Raman orientation parameter ν, M and m are larger, the orientation of molecular chain develops and the strength of the porous hollow-fiber membrane increases. On the other hand, if the ratio M/m of the maximum Raman orientation parameter M and the minimum Raman orientation parameter m is large, this means that the difference in the orientation degree between a portion where orientation has developed and a portion where orientation has not developed is large. When the ratio is 4.0 or less, a stress can be prevented from concentrating on a portion where orientation has not developed and conse-quently, the porous hollow-fiber membrane is hardly buckled, as a result, high toughness is obtained. For this reason, in the present invention, M/m is preferably from 1.5 to 4.0, more preferably from 2.0 to 3.5, still more preferably from 2.5 to 3.0.

(b) Orientation Degree in X-Ray Diffraction Measurement

In the porous hollow-fiber membrane of the present invention, the molecular chain of the fluororesin-based polymer is oriented in the longitudinal direction of the porous hollow-fiber membrane, and the orientation degree π of the molecular chain in X-ray diffraction measurement is less than 0.4, or the molecular chain is non-oriented. The orientation degree π is calculated from a half-width (°) obtained by wide-angle X-ray diffraction measurement, based on the following formula (2).

$$\text{Orientation degree } \pi=(180°-H)/180° \qquad (2)$$

(H is a half-width (°) of the diffraction intensity distribution in the circumferential direction of a wide-angle X-ray diffraction image.)

The method for measuring the orientation degree π of the molecular chain in the longitudinal direction of the porous hollow-fiber membrane is specifically described below.

In order to calculate the orientation degree π, the porous hollow-fiber membrane is fixed to a fiber sample stage by arranging its longitudinal direction to run vertically. Here, the short-side direction of the porous hollow-fiber membrane is a direction parallel to the diameter direction of the hollow fiber, and the longitudinal direction is a direction perpendicular to the short-side direction. The short-side direction can be interchanged with a direction parallel to the hollow plane, i.e., an in-plane direction of the hollow plane, and the longitudinal direction can be interchanged with a direction perpendicular to the hollow plane.

When X-ray diffraction is performed, an annular diffraction image called a Debye-Scherrer ring is obtained. In the case of a non-oriented sample, a great change is not observed in the diffraction intensity along the Debye-Scherrer ring, but in the case of an oriented sample, the intensity distribution is biased on the Debye-Scherrer ring. Accordingly, the orientation degree can be calculated from this intensity distribution based on the formula (2) above.

More specifically, in the case where the molecular chain is non-oriented, when 2θ/θ scanning is performed in the short-side direction (i.e., when a diffraction pattern showing a diffraction intensity distribution in the diameter direction of Debye-Scherrer ring is obtained), a peak is observed at a position around the diffraction angle 2θ=20°. The abscissa axis of the diffraction pattern obtained here is the diffraction angle 2θ of X-ray, and the ordinate axis is the diffraction intensity. Furthermore, the sample is scanned in the azimuth angle β direction by fixing the diffraction angle 2θ to the peak position above, i.e., around 20°, as a result, a diffraction pattern in which the abscissa axis shows the azimuth angle β and the ordinate axis shows the diffraction intensity (i.e., a diffraction intensity distribution along the circumferential direction of Debye-Scherrer ring at the position of diffraction angle 2θ=20°) is obtained. In the case of a non-oriented sample, the diffraction intensity is substantially constant throughout 360° in the circumferential direction of Debye-Scherrer ring.

On the other hand, in the case where the molecular chain is oriented in the longitudinal direction of the porous hollow-fiber membrane, a strong diffraction intensity is observed on the azimuth angle corresponding to the short-side direction of the hollow-fiber membrane (i.e., on the equatorial line) on the Debye-Scherrer ring around 2θ=20°, and a small diffraction intensity is obtained in other portions. More specifically, in the case of an oriented sample, the diffraction intensity distribution in the diameter direction of Debye-Scherrer ring shows, similarly to a non-oriented sample, a diffraction peak around 2θ=20°, and the distribution in the circumferential direction shows, unlike a non-oriented sample, a diffraction peak on the azimuth angle corresponding to the short-side direction of the hollow-fiber membrane.

In the description above, the position of diffraction peak in the diameter direction of Debye-Scherrer ring (i.e., the value of 2θ corresponding to the diffraction peak) is "around 20°". However, the value of 2θ differs depending on the structure or blending of polymer and may range from 15 to 25°. For example, when X-ray diffraction is performed for a polyvinylidene fluoride homopolymer having an α crystal or β crystal, a diffraction peak derived from a (110) plane of α crystal or β crystal, i.e., a plane parallel to molecular chain, is observed around 2θ=20.4°.

As described above, the intensity distribution in the azimuth angle direction is obtained by fixing the value of diffraction angle 2θ and furthermore, measuring the intensity in the range from 0° up to 360° in the azimuth angle direction (circumferential direction). This intensity distribution may also be said to be an intensity distribution obtained by scanning a crystal peak in a diffraction image in the circumferential direction. Here, when the ratio between the intensity at an azimuth angle of 180° (longitudinal direction) and the intensity at an azimuth angle of 90° (short-side direction) is 0.80 or less or 1.25 or more, it is regarded that a peak is present, and using the intensity distribution in this azimuth angle direction, the width at a position of half the peak height (half-width H) is determined.

In the intensity distribution obtained by scanning a crystal peak in the circumferential direction, when the ratio between the intensity at an azimuth angle of 180° and the intensity at an azimuth angle of 90° is within the range of more than 0.80 and less than 1.25, it is regarded that a peak is absent. That is, in this case, the fluororesin-based polymer is determined to be non-oriented. The orientation degree π is calculated by substituting the half-width H into formula (2) above.

In the porous hollow-fiber membrane of the present invention, the orientation degree π of the molecular chain of the fluororesin-based polymer in the longitudinal direction of the porous hollow-fiber membrane is preferably less than 0.4. The molecular chain of the fluororesin-based polymer may be non-oriented relative to the longitudinal direction of the porous hollow-fiber membrane. High toughness is obtained when the porous hollow-fiber membrane is in the state of small orientation degree, particularly, in the non-oriented state. When wide-angle X-ray diffraction measurement is performed at measurement points at intervals of 1 cm in the longitudinal direction of the porous hollow-fiber membrane, it is preferred that at 80% or more of the measurement points, the orientation degree π of the molecular chain of the fluororesin-based polymer is less than 0.4 or the molecular chain of the fluororesin-based polymer is non-oriented.

In the case where the hollow-fiber membrane contains an α crystal or β crystal of polyvinylidene fluoride, the half-width H is preferably determined from an intensity distribution obtained by circumferentially scanning a crystal peak (2θ=20.4°) derived from a (110) plane of the α crystal or β crystal of polyvinylidene fluoride in wide-angle X-ray diffraction measurement.

The orientation degree π determined by wide-angle X-ray diffraction measurement represents the orientation of molecular chain of the entire porous hollow-fiber membrane, and the Raman orientation parameter ν determined by Raman spectroscopy tends to represent the orientation of molecular chain when focus is directed onto the columnar texture of the porous hollow-fiber membrane, i.e., the orientation of local molecular chain. In the porous hollow-fiber membrane of the present invention, crystal orientation of the entire porous hollow-fiber membrane in wide-angle X-ray diffraction is not observed, but the local molecular chain in Raman spectroscopy is in the oriented state, so that both high strength and high toughness can be achieved.

It is preferred that the orientation degree π by wide-angle X-ray diffraction is less than 0.4 or the molecular chain is non-oriented, and the Raman orientation parameter ν by Raman spectroscopy is 1.5 or more, and it is more preferred that the Raman orientation parameter ν is 2.0 or more.

(1-4) Porosity

In the porous hollow-fiber membrane of the present invention, in order to satisfy both high pure-water permeation performance and high strength, the porosity is preferably from 40 to 80%, more preferably from 45 to 75%, still more preferably from 50 to 70%. When the porosity is 40% or more, high pure-water permeation performance is obtained, whereas when it is 80% or less, high strength is obtained and therefore, the membrane is suitable as a porous hollow-fiber membrane for water treatment.

The porosity of the porous hollow-fiber membrane is determined according to the following formula (5) by using the area of resin portion and the area of void portion in the cross-section as described above. In order to increase the accuracy, it is preferable to determine the porosity for arbitrary 20 or more, preferably 30 or more, cross-sections and use an average value thereof.

$$\text{Porosity (\%)} = \{100 \times (\text{area of void portion})\} / \{(\text{area of resin portion}) + (\text{area of void portion})\} \quad (5)$$

(1-5) Young's Modulus

The porous hollow-fiber membrane of the present invention preferably has high toughness suitable for practical use, and the toughness can be denoted by the Young's modulus of a tensile test. The Young's modulus of the porous hollow-fiber membrane may be selected according to use of the porous hollow-fiber membrane but is preferably 0.15 GPa or more and less than 0.40 GPa, more preferably 0.22 GPa or more and less than 0.38 GPa, still more preferably 0.24 GPa or more and less than 0.36 GPa. When the Young's modulus is 0.15 GPa or more, the hollow-fiber membrane is less likely to be deformed even if a stress is applied during use. In addition, when the Young's modulus is less than 0.40 GPa, even if the hollow membrane is shaken, for example, by scrubbing cleaning, etc. which is frequently conducted in the application for water treatment, the yean breakage in hollow-fiber membrane hardly occurs.

(1-6) Others

The porous hollow-fiber membrane of the present invention may contain a texture other than the above-described columnar texture to the extent not departing from the object of the present invention. The structure other than the columnar texture includes, for example, a spherical texture having an aspect ratio (longitudinal length/short-side length) of less than 3. The short-side length and longitudinal length of the spherical texture are preferably from 0.5 to 3 μm. In the case of using a spherical texture, as long as the short-side length and longitudinal length thereof are in the range above, reduction in the strength of the porous hollow-fiber membrane can be prevented, and good pure-water permeation performance can be maintained.

However, if the proportion of such a spherical texture having an aspect ratio of less than 3 in the porous hollow-fiber membrane is increased, spherical textures are increasingly coupled with each other to increase the narrowed portion and, thereby there arises a tendency that it is difficult to perform high-ratio stretching or keep the elongation after stretching. For this reason, a smaller proportion of the spherical texture in the porous hollow-fiber membrane is more preferred, and the proportion is preferably less than 20%, more preferably less than 10%, still more preferably less than 1%, i.e., almost nil. It is most preferred that the spherical texture is not present at all.

Here, the occupancy (%) of each texture is determined according to the following formula (6) after taking a photograph of a cross-section in the longitudinal direction of the porous hollow-fiber membrane by means of SEM, etc. at a magnification enabling clear identification of a columnar texture and a spherical texture, preferably at a magnification of 1,000 to 5,000 times. In order to increase the accuracy, it is preferable to determine the occupancy for arbitrary 20 or more, preferably 30 or more, cross-sections and calculate an average value thereof.

$$\text{Occupancy (\%)} = \{(\text{area occupied by each texture})/(\text{area of entire photograph})\} \times 100 \quad (6)$$

The area of the entire photograph and the area occupied by a texture can be determined preferably by employing, for example, a method of converting into a weight corresponding to each texture photographed. That is, the photograph taken may be printed on paper, and the weight of paper corresponding to the entire photograph and the weight of paper corresponding to a texture portion cut out therefrom may be measured. In addition, before taking a photograph by SEM, etc., the above-described resin embedding/dyeing treatment and FIB cutting are preferably applied, because the observation accuracy increases.

The porous hollow-fiber membrane of the present invention may be one in which a layer having the above-described columnar texture and a layer having other structure are stacked to the extent not departing from the object of the present invention. However, if the thickness of the layer having other structure is large compared with the layer having the columnar texture, the object and effects of the present invention can hardly be exerted and therefore, the ratio of the thickness of the layer having other structure to the thickness of the layer having the columnar texture is preferably 0.3 or less, more preferably 0.2 or less.

In the porous hollow-fiber membrane of the present invention, it is preferred that the pure-water permeation performance at 50 kPa and 25° C. is 0.7 m$^3$/m$^2$/hr or more and the breaking strength is 23 MPa or more, and it is more preferred that the pure-water permeation performance at 50 kPa and 25° C. is 0.7 m$^3$/m$^2$/hr or more and the breaking strength is 25 MPa or more. Above all, from the viewpoint of providing a high-performance hollow-fiber membrane satisfying both high pure-water permeation performance and high strength performance, it is preferred that the pure-water permeation performance at 50 kPa and 25° C. is from 0.7 to 5.0 m$^3$/m$^2$/hr and the breaking strength is in the range from 23 to 70 MPa, and it is more preferred that the pure-water permeation performance at 50 kPa and 25° C. is from 0.7 to 5.0 m$^3$/m$^2$/hr and the breaking strength is in the range from 30 to 60 MPa.

The measurement of pure-water permeation performance is performed by manufacturing a miniature module of 200 mm in length including 4 porous hollow-fiber membranes. External pressure dead-end filtration of reverse osmosis membrane filtrate is performed for 10 minutes under the conditions of a temperature of 25° C. and a filtration pressure difference of 16 kPa, and the permeation amount (m$^3$) is determined. The permeation amount (m$^3$) is converted into a value per unit time (h) and effective membrane area (m$^2$), further multiplied by (50/16), and thereby converted into a value at a pressure of 50 kPa to determine the pure-water permeation performance.

The methods for measuring the breaking strength and the elongation at break are not particularly limited but, for example, using a tensile tester, a tensile test of a sample having a measurement length of 50 mm is performed 5 or more times by changing the sample at a tensile speed of 50 mm/min, and the breaking strength and the elongation at break can be measured by determining average values thereof.

The porous hollow-fiber membrane described above has sufficient pure-water permeation performance, strength and elongation for various water treatments such as drinking water production, industrial water production, water purification treatment, wastewater treatment, seawater desalination, and industrial water production.

2. Production Method of Porous Hollow-Fiber Membrane

The method for producing the porous hollow-fiber membrane of the present invention is described below by way of example. The method for producing a porous hollow-fiber membrane includes at least:

1) a step of forming a hollow fiber having a columnar texture from a membrane-forming solution containing a fluororesin-based polymer by thermally induced phase separation, in which the columnar texture is oriented in the longitudinal direction and has a thickness uniformity of 0.50 or more and less than 1.00; and 2) a step of stretching the porous hollow fiber obtained in 1) above to 1.8 to 2.4 times in the longitudinal direction at a stretching speed of 1 to 150%/s.

(2-1) Preparation of Membrane-Forming Solution

The production method of the porous hollow-fiber membrane in the present invention further includes a step of preparing a fluororesin-based polymer solution. A fluororesin-based polymer solution (i.e., a membrane-forming solution containing a fluororesin-based polymer) is prepared by dissolving a fluororesin-based polymer in a poor or good solvent for the fluororesin-based polymer at a relatively high temperature of not less than the crystallization temperature.

When the polymer concentration in the membrane-forming solution is high, a porous hollow-fiber membrane having high strength is obtained. On the other hand, when the polymer concentration is low, the porosity of the porous hollow-fiber membrane is increased, and the pure-water permeation performance is enhanced. Accordingly, the concentration of the fluororesin-based polymer is preferably from 20 to 60 wt %, more preferably from 30 to 50 wt %.

In the present description, the poor solvent is a solvent in which the fluororesin-based polymer cannot be dissolved to a concentration of 5 wt % or more at a low temperature of 60° C. or less but can be dissolved to a concentration of 5 wt % or more in a high-temperature region between 60° C. or more and not more than the melting point of the fluororesin-based polymer (for example, when the polymer is composed of a vinylidene fluoride homopolymer alone, about 178° C.). The good solvent is a solvent in which the fluororesin-based polymer can be dissolved to a concentration of 5 wt % or more even in a low-temperature region of 60° C. or less. A nonsolvent is defined as a solvent in which the fluororesin-based polymer is neither dissolved nor swollen at a temperature up to the melting point of the fluororesin-based polymer or the boiling point of the solvent.

The poor solvent for the fluororesin-based polymer includes cyclohexanone, isophorone, γ-butyrolactone, methyl isoamyl ketone, propylene carbonate, dimethylsulfoxide, etc., and a mixed solvent thereof. The good solvent includes N-methyl-2-pyrrolidone, dimethylacetamide, dimethylformamide, methyl ethyl ketone, acetone, tetrahydrofuran, tetramethylurea, trimethyl phosphate, etc., and a mixed solvent thereof. The nonsolvent includes water, hexane, pentane, benzene, toluene, methanol, ethanol, carbon tetrachloride, o-dichlorobenzene, trichloroethylene, ethylene glycol, diethylene glycol, triethylene glycol, propylene glycol, butylene glycol, pentanediol, hexanediol, an aliphatic hydrocarbon such as low-molecular-weight polyethylene glycol, an aromatic hydrocarbon, an aliphatic polyhydric alcohol, an aromatic polyhydric alcohol, a chlorinated hydrocarbon, other chlorinated organic liquids, a mixed solvent thereof, etc.

(2-2) Formation of Hollow Fiber

In the hollow fiber forming step, a hollow fiber is obtained from a membrane-forming solution containing a fluororesin-based polymer by utilizing a thermally induced phase separation method of inducing phase separation by temperature change. In order to perform the later-described high-ratio stretching of 1.8 times or more, it is preferred that the hollow fiber has a columnar texture oriented in its longitudinal direction and the thickness uniformity of the columnar texture is 0.50 or more and less than 1.00. The lower limit of the thickness uniformity of the columnar texture is more preferably 0.60 or more, still more preferably 0.70 or more, yet still more preferably 0.80 or more.

In the thermally induced phase separation method, two kinds of phase separation mechanisms are mainly utilized. One is a liquid-liquid phase separation method in which a polymer solution dissolved uniformly at a high temperature is separated into a polymer-rich phase and a polymer-poor phase due to reduction in the dissolving ability of the solution during a temperature drop and the structure is thereafter fixed by crystallization. Another is a solid-liquid phase separation method in which a polymer solution dissolved uniformly at a high temperature is phase-separated into a polymer solid phase and a solvent phase due to occurrence of crystallization of the polymer during a temperature drop.

A three-dimensional network structure is mainly formed in the former method, and a spherical structure constituted by a spherical texture is mainly formed in the latter method. In the production of the hollow-fiber membrane of the present invention, the latter phase separation mechanism is preferably utilized. Accordingly, a polymer concentration and a solvent, inducing solid-liquid phase separation, are selected. In the former phase separation mechanism, it is difficult to develop the above-described columnar texture oriented in the longitudinal direction of the hollow-fiber. This is because the polymer-rich phase forms a very fine phase by phase separation before the structure is fixed, and cannot be made columnar.

As a specific method, a hollow part-forming liquid is discharged through an inner tube of a double tube-type spinneret for spinning of a porous hollow-fiber membrane while discharging the above-described membrane-forming solution through an outer tube of the double tube-type spinneret. The thus-discharged membrane-forming solution is cooled and solidified in a cooling bath to obtain a porous hollow-fiber.

The fluororesin-based polymer solution is, before being discharged from the spinneret, held in a specific temperature condition for a given time under pressure. The pressure is preferably 0.5 MPa or more, more preferably 1.0 MPa or more. The temperature T of the polymer solution preferably satisfies Tc+35° C.≤T≤Tc+60° C., more preferably satisfies Tc+40° C.≤T≤Tc+55° C. Tc is the crystallization temperature of the fluororesin-based polymer solution. The time for which the polymer solution is held under these pressure and temperature is preferably 10 seconds or more, more preferably 20 second or more.

Specifically, at any site of a solution feed line for delivering the polymer solution to the spinneret, a retention part for allowing the polymer solution to stay is provided, and a pressurizing unit for applying a pressure to the retained polymer solution and a temperature-adjusting unit for adjusting the temperature of the retained polymer solution (for example, a heating unit) are provided. The pressurizing unit is not particularly limited, but by disposing two or more pumps in the solution feed line, a pressure can be applied to any site therebetween. The pump includes a piston pump, a plunger pump, a diaphragm pump, a wing pump, a gear pump, a rotary pump, a screw pump, etc., and two or more kinds thereof may be used.

Through this step, a pressure is applied under the conditions in which crystallization easily takes place, and therefore, it is presumed that crystal growth has anisotropy and in turn, not an isotropic spherical structure but a texture oriented in the longitudinal direction of the porous hollow-fiber membrane is developed, as a result, a columnar structure is obtained.

Here, the crystallization temperature Tc of the fluororesin-based polymer solution is defined as follows. In an apparatus for differential scanning calorimetry (DSC measurement), a mixture having the same composition as the composition of the membrane-forming polymer solution containing a fluororesin-based polymer, a solvent, etc. is sealed in a sealing type DSC container and uniformly dissolved by raising the temperature to a dissolution temperature at a temperature rise rate of 10° C./min and holding the temperature for 30 minutes, and a rise temperature of a crystallization peak observed in the process of thereafter lowering the temperature at a temperature drop rate of 10° C./min is Tc.

The cooling bath for cooling the fluororesin-based polymer solution discharged from the spinneret is described below. In the cooling bath, a mixed liquid including a poor or good solvent in a concentration of 50 to 95 wt % and a nonsolvent in a concentration of 5 to 50 wt % is preferably used. As the poor solvent, use of the same poor solvent as that in the polymer solution is preferably employed. For the hollow part-forming liquid, as with the cooling bath, a mixed liquid including a poor or good solvent in a concentration of 50 to 95 wt % and a nonsolvent in a concentration of 5 to 50 wt % is preferably used. As the poor solvent, use of the same poor solvent as that in the polymer solution is preferably employed.

Here, in order to develop not a fibrous texture having a large number of narrowed portions but a columnar texture having a uniform thickness, it is preferable to promote polymer uptake/growth into the narrowed portion. The present inventors have found that the polymer uptake/growth into the narrowed portion leads to disappearance of a narrowed portion having high interface energy and can energetically stabilize and therefore be caused to preferentially occur over the growth in portions other than the narrowed portion, and intensive studies have been made on the method for enhancing the thickness uniformity.

As a result, it has been found that as the method for uptaking polymer into the narrowed portion and thereby promoting the texture growth, the thermally induced phase separation preferably includes at least one of the following cooling steps a) and b).

a) A step of soaking the membrane-forming solution in a cooling bath at a temperature Tb satisfying Tc−30° C.<Tb≤Tc b) A step of soaking the membrane-forming solution in a cooling bath at a temperature Tb1 satisfying Tb1≤Tc−30° C., followed by soaking in a cooling bath at a temperature Tb2 satisfying Tc−30° C.<Tb2≤Tc (Tc is the crystallization temperature of the membrane-forming solution containing a fluororesin-based polymer.)

In the present invention, it has been found that as the method a), when cooling/solidification in a cooling bath is performed near the crystallization temperature of the polymer solution, the cooling/solidification slowly proceeds. In this case, denoting Tc as the crystallization temperature of the fluororesin-based polymer solution, the temperature Tb of the cooling bath is set to satisfy Tc−30° C.<Tb≤Tc, and Tc−20° C.<Tb≤Tc is more preferred.

The passing time in the cooling bath (i.e., soaking time in the cooling bath) is not particularly limited as long as enough time to complete the thermally induced phase separation including polymer uptake/growth into the narrowed portion can be ensured, and it may be experimentally determined by taking into account the number of hollow-fiber membranes, the spinning speed, the bath ratio, the cooling capacity, etc. However, in order to achieve thickness uniformity, the passing time is preferably set to be as long as possible in the above-described temperature range of the cooling bath and may be, for example, 10 seconds or more, preferably 20 seconds or more, more preferably 30 seconds or more.

In addition, as the method b), two or more stages of cooling may be performed. Specifically, the cooling step may include a step of cooling by using a first cooling bath for promoting generation/growth of a crystal nucleus by increasing the supercooling degree, and a step of thereafter cooling by using a second cooling bath for promoting polymer uptake/growth into the narrowed portion. The cooling step by the second cooling bath utilizes a phenomenon that the polymer uptake/growth into the narrowed portion preferentially occurs mainly in the structure coarsening process of the phase separation.

In this case, when the temperature Tb1 of the first cooling bath for cooling the fluororesin polymer solution discharged from the spinneret satisfies Tb1≤Tc−30° C., the generation and growth of a crystal nucleus can be promoted by increasing the supercooling degree, and when the temperature Tb2 of the second cooling bath is set to a temperature near the crystallization temperature (specifically, set to satisfy Tc−30° C.<Tb2≤Tc, preferably Tc−20° C.<Tb2≤Tc), the polymer uptake/growth into the narrowed portion can be promoted. Tc is the crystallization temperature of the polymer solution.

The passing time in each cooling bath can be varied, but it is favorable to set, for example, the passing time in the first cooling bath to be from 1 to 20 seconds, preferably from 3 to 15 seconds, more preferably from 5 to 10 seconds, and set the passing time in the second cooling bath to be 10 seconds or more, preferably 20 seconds or more, more preferably 30 seconds or more.

When a texture having a thickness uniformity of less than 0.50 is referred to as "fibrous texture" so as to distinguish it from the columnar texture, the one disclosed in JP-A-2006-297383 (Patent Document 1) is a hollow-fiber membrane having a fibrous texture. Such a porous hollow-fiber membrane having a fibrous texture is relatively excellent in strength and pure-water permeation performance, and the present inventors have therefore attempted to increase the strength by stretching this membrane. However, it has been found that the membrane cannot be uniformly stretched and the strength cannot be increased.

In general, a porous membrane used for water treatment has a large number of void parts for passing water and since destruction of the texture proceeds starting from a void part at the time of stretching, the stretching itself is very difficult. This tendency is prominent in particular when the porous hollow-fiber membrane has a phase-separation porous structure obtained by dry-wet spinning utilizing a principle of nonsolvent induced phase separation or thermally induced phase separation, because a large number of fine voids are present and the porosity is high.

In the case of the porous membrane having a fibrous texture described in Patent Document 1, it is considered that stress during stretching is dispersed by the fibrous texture oriented in the longitudinal direction and stretching can be thereby performed. However, a great enhancement of the breaking strength is not achieved, and intensive studies on the cause thereof have revealed that a fibrous texture has many narrowed portions and because stress is concentrated at the narrowed portion during stretching and the narrowed portion is therefore preferentially stretched, the entire fibrous texture cannot be uniformly stretched, making it impossible to increase the stretch ratio.

In contrast, the present inventors have found that when the hollow fiber is one having a columnar texture with uniform thickness, the entire columnar texture can be uniformly stretched. Such uniform and high-ratio stretching has yielded success in stretching and orienting the molecular chain of the fluororesin-based polymer in the longitudinal direction of the porous hollow-fiber membrane and success in increasing the strength while maintaining high pure-water permeation performance.

(2-3) Stretching

In the present invention, the porous hollow-fiber including a fluororesin-based polymer and having a columnar texture, obtained by the method above, is stretched at a low speed and high ratio, and the molecular chain of the polymer is thereby oriented in the longitudinal direction of the hollow-fiber membrane. As a result, a Raman orientation parameter and an orientation degree in X-ray diffraction, each in the above-described range, are realized.

The stretch ratio is preferably from 1.8 to 2.4 times, more preferably from 1.9 to 2.3 times. When the stretch ratio is 1.8 times or more, the molecular chain can be sufficiently oriented by stretching and therefore, the strength of the porous hollow-fiber membrane can be increased. In addition, when the stretch ratio is 2.4 times or less, the pore size of the porous hollow-fiber membrane does not become too small, so that high water permeability can be realized and the elongation and toughness can be maintained.

In the present invention, the stretching speed is preferably from 1 to 150%/s, more preferably from 3 to 100%/s, still more preferably from 5 to 50%/s. When the stretching speed is 1%/s or more, the membrane can be stretched without extremely increasing the size of the stretching treatment equipment. In addition, when the stretching speed is 150%/s or less, the membrane can be homogeneously stretched stably.

The hollow fiber having a columnar texture is stretched at the above-described low speed, and the entire hollow fiber can thereby be homogeneously stretched, as a result, homogeneous orientation can proceed. This homogeneous stretching is considered to include homogeneous stretching of the entirety of one columnar texture and stretching of a plurality of different columnar textures to the same extent.

As described above, the columnar texture is formed by uptaking polymer into the narrowed portion of a solid matter that has been previously formed. Since the growth rate differs between the previously formed solid matter and the portion formed thereafter, the microscopic structure (for example, the number of molecular chain entanglements per volume) is considered to differ. Accordingly, performing stretching at a low speed is preferred also for preventing breakage and achieving uniform stretching.

The stretching speed is calculated as follows.

Stretching speed (%/s)=(stretch ratio×100−100)
÷stretching time (sec)

Here, the stretch ratio is calculated by "length (m) after stretching÷length (m) before stretching". For the stretching time, the time (sec) substantially used for stretching is employed. The stretch ratio may be calculated from the set speed of the stretching apparatus, but it is better to dye the porous hollow-fiber membrane immediately before stretching to a length of 10 cm in its longitudinal direction, conduct stretching, and measure the length of the colored portion before and after the stretching. On this occasion, the time actually used for stretching can also be measured.

The stretching temperature is preferably from 60° C. to 140° C., more preferably from 70° C. to 120° C., still more preferably from 80° C. to 100° C. When stretching is performed in an atmosphere of 60° C. or more, the hollow fiber can be stably and homogeneously stretched. In addition, when the stretching temperature is 140° C. or less, the fluororesin-based polymer can be prevented from melting and can be stretched and oriented. Stretching in a liquid is preferred because of ease of temperature control, but the stretching may also be performed in a gas such as steam. As the liquid, water is simple and preferred, but in the case of stretching at about 90° C. or more, use of a low-molecular-weight polyethylene glycol, etc. may also be preferably employed.

EXAMPLES

The present invention is described below by referring to specific Examples, but the present invention is not limited by these Examples in any way. The physical property values related to the present invention can be measured by the following methods.

(i) Pure-Water Permeation Performance

A compact module including 4 porous hollow-fiber membranes and having an effective length of 200 mm was manufactured. Distilled water was delivered to the module over 1 hour under the conditions of a temperature of 25° C. and a filtration pressure difference of 16 kPa, and the amount ($m^3$) of the permeate obtained was measured, converted into a numerical value per unit time (h) and unit membrane area ($m^2$), further converted in terms of a pressure (50 kPa), and used as the pure-water permeation performance ($m^3/m^2/h$). The unit membrane area was calculated from the average outside diameter and the effective length of the porous hollow-fiber membrane.

(ii) Breaking Strength, Elongation at Break, Young's Modulus

Using a tensile tester (TENSILON (registered trademark)/RTM-100, manufactured by Toyo Baldwin Co., Ltd.), a sample having a measurement length of 50 mm was tested five or more times by changing the sample in an atmosphere of 25° C. at a tensile speed of 50 mm/min, and the breaking strength, elongation at break and Young's modulus were calculated by determining respective average values.

(iii) Raman Orientation Parameter ν

The orientation parameter of the polyvinylidene fluoride homopolymer in the porous hollow-fiber membrane was determined by the following operation.

A cross-section in the longitudinal direction of the porous hollow-fiber membrane was sliced by cutting with a microtome, and 10 columnar textures were selected per one porous hollow-fiber membrane. For each columnar texture, the scattering intensity was measured by laser Raman spectroscopy at 1 μm intervals along the longitudinal direction of columnar texture while checking the columnar texture by an optical microscope.

The orientation parameter of each was calculated according to formula (1), and an average value of respective orientation parameters was defined as the Raman orientation parameter ν. In addition, among 10 columnar textures different from each other, a largest orientation parameter and a smallest orientation parameter were selected, respective average values were determined and denoted as maximum Raman orientation parameter M and the minimum Raman orientation parameter m, and M/m was calculated.

Raman orientation parameter=(I1270/I840)parallel/
(I1270/I840)perpendicular       (1)

Parallel condition: the longitudinal direction of the porous hollow-fiber membrane is parallel to the polarization direction Perpendicular condition: the longitudinal direction of the porous hollow-fiber membrane is orthogonal to the polarization direction I1270 parallel: the intensity of Raman band at 1,270 $cm^{-1}$ under parallel condition I1270 perpendicular: the intensity of Raman band at 1,270 $cm^{-1}$ under perpendicular condition I840 parallel: the intensity of Raman band at 840 $cm^{-1}$ under parallel condition I1840 perpendicular: the intensity of Raman band at 840 cm$^{-1}$ under perpendicular condition The laser Raman spectrometer and measurement conditions are as follows.

Apparatus: Jobin Yvon/Atago Bussan, T-64000
Conditions:
Measurement mode: micro-Raman
Object lens: ×100
Beam diameter: 1 µm
Light source: Ar+laser/514.5 nm
Laser power: 100 mW
Diffraction grating: Single 600 gr/mm
Slit: 100 µmm
Detector: CCD/Jobin Yvon 1024×256

(iv) Thickness Uniformity

First, the porous hollow-fiber membrane was resin-embedded in an epoxy resin and subjected to osmium dyeing treatment, and the void portion was thereby filled with the epoxy resin. Next, using a scanning electron microscope (SEM) equipped with a focused ion beam (FIB), a face parallel to the short-side direction of the porous hollow-fiber membrane was cut out using FIB, and FIB cutting and SEM observation were repeatedly conducted 200 times at 50 nm intervals toward the longitudinal direction of the porous hollow-fiber membrane to obtain information having a depth of 10 µm.

The thickness uniformity was determined by comparing a first cross-section and a second cross-section each running in parallel to the short-side direction of the porous hollow-fiber membrane, which were obtained in the above-described continuous cross-sectional observation using FIB. Here, 20 pairs of first cross-section and second cross-section were selected such that these cross-sections were faces parallel to each other and spaced 5 µm apart.

First, in each cross-section, a portion including resin and a void portion (epoxy portion) were distinguished, and the area of the resin portion and the area of the void portion were measured. Subsequently, the area (overlap area) of a portion where when the first cross-section is projected onto the second cross-section from a direction perpendicular to both cross-sections, the portion including resin in the first cross-section and the portion including resin in the second cross-section are overlapped, was determined.

The thickness uniformities in each pair were calculated as values obtained by averaging thickness uniformities A and B determined according to the following formulae (3) and (4). Since 20 average values of A and B are obtained, an average value obtained from these 20 values was defined as the thickness uniformity of the membrane.

In addition, the membrane was determined to have a columnar texture when 16 pairs or more have a thickness uniformity of 0.50 or more, and determined to have a fibrous texture when 15 pairs or less have the thickness uniformity above.

Thickness uniformity $A$=(overlap area)/(area of resin portion of second cross-section)  (3)

Thickness uniformity $B$=(overlap area)/(area of resin portion of first cross-section)  (4)

(v) Orientation Degree π of Molecular Chain in Longitudinal Direction of Porous Hollow-Fiber Membrane A porous hollow-fiber membrane was fixed to a fiber sample stage by arranging its longitudinal direction to run vertically and subjected to X-ray diffraction measurement (2θ/θ scanning, β scanning) by using an X-ray diffractometer (SmartLab for polymer, CuKα ray, manufactured by Rigaku Corporation). First, it was confirmed by 2θ/θ scanning that a peak top is present at 2θ=20.4°. Next, the intensity in the range from 0° up to 360° in the azimuth angle direction, relative to the diffraction peak at 2θ=20.4°, was measured by β scanning to obtain an intensity distribution in the azimuth angle direction. Here, when the ratio between the intensity at an azimuth angle of 180° and the intensity at an azimuth angle of 90° was 0.80 or less or was 1.25 or more, it is regarded that a peak is present and by determining the width at a position of half the peak height (half-width H) from the intensity distribution in the azimuth angle direction, the orientation degree π was calculated according to the following formula (2). Since a minimum value of the intensity in β scanning was observed at around 0° and 180°, a straight line passing these points was used as a baseline.

Orientation degree $\pi=(180°-H)/180°$  (2)

(vi) Longitudinal Length and Short-Side Length of Columnar Texture

With respect to the porous hollow-fiber membrane manufactured in each working example, a cross-section along its longitudinal direction was photographed at a magnification of 3,000 times by means of a scanning electron microscope. On the image photographed, 10 columnar textures were randomly selected, and the longitudinal length and short-side length of each texture were measured. Here, as the longitudinal length of each columnar texture, the maximum length in the longitudinal direction was measured. Furthermore, as described above, a value obtained by dividing the longitudinal length of each columnar texture by 1 µm and rounding the quotient down to the nearest integer is used as the number of measurement points, and the short-side length of each columnar texture was determined by measuring the length in the short-side direction and calculating an average value thereof.

The photographing above was performed at 5 sites and by determining the longitudinal length and short-side length for arbitrary 10 columnar textures at each site, a total of 50 longitudinal lengths and a total of 50 short-side lengths were obtained. Subsequently, an average value of a total of 50 longitudinal lengths was calculated and used as a representative value of the longitudinal length, and an average value of a total of 50 short-side lengths was calculated and used as a representative value of the short-side length.

(vii) Porosity

With respect to arbitrary 20 cross-sections selected from 20 pairs of first cross-section and second cross-section obtained in "(vi) Thickness Uniformity", i.e., a total of 40 cross-sections, the porosity was determined according to the following formula (5) by using the area of the resin portion and the area of the void portion, and an average value thereof was used.

Porosity (%)={100×(area of void portion)}/{(area of resin portion)+(area of void portion)}  (5)

(viii) Occupancy of Texture

The occupancy of the texture was determined according to the following formula (6) after taking a photograph of a cross-section in the longitudinal direction of the porous hollow-fiber membrane by means of a scanning electron microscope at a magnification of 3,000 times in arbitrary 20 places, and an average value thereof was employed. Here, the area of the entire photograph and the area occupied by a texture were determined by printing the taken photograph on paper and respectively converting into the weight of paper corresponding to the entire photograph and the weight of paper corresponding to a texture portion cut out therefrom.

Occupancy (%)={(area occupied by each texture)/
(area of entire photograph)}×100    (6)

(ix) Crystallization Temperature Tc of Fluororesin-Based Polymer Solution

Using DSC-6200 manufactured by Seiko Instruments & Electronics Ltd., a mixture having the same composition as the composition of the membrane-forming polymer solution containing a fluororesin-based polymer, a solvent, etc. was sealed in a sealing type DSC container and uniformly dissolved by raising the temperature to a dissolution temperature at a temperature rise rate of 10° C./min and holding the temperature for 30 minutes, and a rise temperature of a crystallization peak observed in the process of thereafter lowering the temperature at a temperature drop rate of 10° C./min was used as the crystallization temperature Tc.

Example 1

35 wt % of a vinylidene fluoride homopolymer (KF1300, produced by Kureha Corporation, weight average molecular weight: 417,000, number average molecular weight: 221,000) having a weight average molecular weight of 417,000 and 65 wt % of γ-butyrolactone were dissolved at 150° C. Tc of the thus-obtained vinylidene fluoride homopolymer solution (i.e., raw material solution) was 46° C.

For the pressurization and discharge of the raw material solution, an apparatus having a double tube-type spinneret, a piping connected to the spinneret, and two gear pumps disposed on the piping was used. Within the piping between gear pumps, the raw material solution was retained at 99 to 101° C. for 15 seconds under a pressure of 2.5 MPa. Thereafter, while discharging an aqueous 85 wt % γ-butyrolactone solution through the inner tube of the double tube-type spinneret, the raw material solution was discharged through the outer tube. The raw material solution was allowed to stay in a cooling bath at a temperature of 20° C. containing an aqueous 85 wt % γ-butyrolactone solution for 20 seconds and thereby solidified.

The obtained porous hollow-fiber had a columnar texture with a thickness uniformity of 0.55, where the occupancy of columnar texture was 85% and the occupancy of spherical texture was 15%.

The porous hollow-fiber obtained above was then stretched to 2.0 times at a stretching speed of 9%/s in water at 95° C.

The porous hollow-fiber membrane after stretching was observed, as a result, a columnar texture was recognized. Furthermore, the porous hollow-fiber membrane had a columnar texture with a representative value of longitudinal length of 16 μm, a representative value of short-side length of 2.1 μm, and a thickness uniformity of 0.51, where the porosity was 56%, the orientation degree π of the molecular chain of vinylidene fluoride homopolymer in the longitudinal direction of the porous hollow-fiber membrane could not be calculated, that is, the the molecular chain was non-oriented, the Raman orientation parameter ν was 1.82, the maximum Raman orientation parameter M was 2.31, the minimum Raman orientation parameter m was 1.32, and M/m was 1.8. The structure and performances of the porous hollow-fiber membrane after stretching are shown in Table 1.

Example 2

A raw material solution was prepared in the same manner as in Example 1 except that the concentration of the vinylidene fluoride homopolymer was changed to 36 wt %. Tc of the raw material solution was 48° C.

The raw material solution was pressurized in the same manner as in Example 1 and then discharged from the double tube-type spinneret. The raw material solution discharged was allowed to stay in a first cooling bath at a temperature of 10° C. containing an aqueous 85 wt % γ-butyrolactone solution for 10 seconds, further allowed to stay in a second cooling bath at a temperature of 20° C. containing an aqueous 85 wt % γ-butyrolactone solution for 20 seconds, and thereby solidified.

The obtained porous hollow-fiber had a columnar texture with a thickness uniformity of 0.64, where the occupancy of columnar texture was 87% and the occupancy of spherical texture was 13%.

The porous hollow-fiber obtained above was then stretched to 2.4 times at a stretching speed of 44%/s in water at 95° C. The porous hollow-fiber membrane after stretching had a columnar texture with a representative value of longitudinal length of 18 μm, a representative value of short-side length of 1.9 μm, and a thickness uniformity of 0.60, where the porosity was 55%, the orientation degree π of the molecular chain of vinylidene fluoride homopolymer in the longitudinal direction of the porous hollow-fiber membrane was 0.25, the Raman orientation parameter ν was 2.35, the maximum Raman orientation parameter M was 2.84, the minimum Raman orientation parameter m was 1.21, and M/m was 2.4. The structure and performances of the porous hollow-fiber membrane after stretching are shown in Table 1.

Example 3

A raw material solution was prepared in the same manner as in Example 1 except that the concentration of the vinylidene fluoride homopolymer was changed to 39 wt %. Tc of the raw material solution was 52° C.

The raw material solution was retained at 99 to 101° C. for 20 seconds under a pressure of 2.5 MPa applied by means of the same apparatus as in Example 1 and then discharged from the double tube-type spinneret in the same manner as in Example 1. The raw material solution discharged was allowed to stay in a first cooling bath at a temperature of 5° C. containing an aqueous 85 wt % γ-butyrolactone solution for 10 seconds, further allowed to stay in a second cooling bath at a temperature of 30° C. containing an aqueous 85 wt % γ-butyrolactone solution for 40 seconds, and thereby solidified.

The obtained porous hollow-fiber had a columnar texture with a thickness uniformity of 0.69, where the occupancy of columnar texture was 91% and the occupancy of spherical texture was 9%.

The porous hollow-fiber obtained above was then stretched to 2.4 times at a stretching speed of 142%/s in water at 95° C.

The porous hollow-fiber membrane after stretching had a columnar texture with a representative value of longitudinal length of 22 μm, a representative value of short-side length of 1.8 μm, and a thickness uniformity of 0.62, where the porosity was 54%, the orientation degree π of the molecular chain of vinylidene fluoride homopolymer in the longitudinal direction of the porous hollow-fiber membrane was 0.31, the Raman orientation parameter ν was 2.53, the maximum Raman orientation parameter M was 3.08, the minimum Raman orientation parameter m was 1.14, and M/m was 2.7. The structure and performances of the porous hollow-fiber membrane after stretching are shown in Table 1.

Example 4

A raw material solution was prepared in the same manner as in Example 1 except that the concentration of the vinylidene fluoride homopolymer was changed to 39 wt %. Tc of the raw material solution was 52° C.

The raw material solution was retained at 99 to 101° C. for 20 seconds under a pressure of 2.5 MPa applied by means of the same apparatus as in Example 1. The raw material solution was then discharged from the double tube-type spinneret in the same manner as in Example 1. The raw material solution discharged was allowed to stay in a first cooling bath at a temperature of 5° C. containing an aqueous 85 wt % γ-butyrolactone solution for 10 seconds, further allowed to stay in a second cooling bath at a temperature of 35° C. containing an aqueous 85 wt % γ-butyrolactone solution for 50 seconds, and thereby solidified.

The obtained porous hollow-fiber had a columnar texture with a thickness uniformity of 0.68, where the occupancy of columnar texture was 92% and the occupancy of spherical texture was 8%.

The porous hollow-fiber obtained above was then stretched to 1.8 times at a stretching speed of 2%/s in water at 95° C.

The porous hollow-fiber membrane after stretching had a columnar texture with a representative value of longitudinal length of 13 μm, a representative value of short-side length of 1.9 μm, and a thickness uniformity of 0.66, where the porosity was 53%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 2.13, the maximum Raman orientation parameter M was 2.69, the minimum Raman orientation parameter m was 1.65, and M/m was 1.6. The structure and performances of the porous hollow-fiber membrane after stretching are shown in Table 1.

Example 5

38 wt % of a vinylidene fluoride homopolymer (KF1300, produced by Kureha Corporation, weight average molecular weight: 417,000, number average molecular weight: 221,000) having a weight average molecular weight of 417,000 and 62 wt % of dimethylsulfoxide were dissolved at 130° C. Tc of the vinylidene fluoride homopolymer solution (i.e., raw material solution) was 29° C.

The raw material solution was retained at 78 to 80° C. for 20 seconds under a pressure of 2.5 MPa applied by means of the same apparatus as in Example 1. Thereafter, while discharging an aqueous 90 wt % dimethylsulfoxide solution through the inner tube of the double tube-type spinneret, the raw material solution was discharged through the outer tube. The raw material solution was allowed to stay in a cooling bath at a temperature of 20° C. containing an aqueous 85 wt % dimethylsulfoxide solution for 20 seconds and thereby solidified.

The obtained porous hollow-fiber had a columnar texture with a thickness uniformity of 0.62, where the occupancy of columnar texture was 94% and the occupancy of spherical texture was 6%.

The porous hollow-fiber obtained above was then stretched to 2.0 times at a stretching speed of 19%/s in water at 95° C. The porous hollow-fiber membrane after stretching had a columnar texture with a representative value of longitudinal length of 19 μm, a representative value of short-side length of 2.3 μm, and a thickness uniformity of 0.61, where the porosity was 57%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 2.32, the maximum Raman orientation parameter M was 2.61, the minimum Raman orientation parameter m was 1.42, and M/m was 1.8. The structure and performances of the porous hollow-fiber membrane after stretching are shown in Table 1.

Example 6

A porous hollow-fiber membrane was obtained in the same manner as in Example 5 except that the raw material solution discharged was allowed to stay in a first cooling bath at a temperature of −3° C. containing an aqueous 85 wt % dimethylsulfoxide solution for 10 seconds and further allowed to stay in a second cooling bath at a temperature of 20° C. containing an aqueous 85 wt % dimethylsulfoxide solution for 30 seconds.

The obtained porous hollow-fiber had a columnar texture with a thickness uniformity of 0.68, where the occupancy of columnar texture was 93% and the occupancy of spherical texture was 7%.

The porous hollow-fiber obtained above was then stretched to 1.8 times at a stretching speed of 146%/s in water at 95° C.

The porous hollow-fiber membrane after stretching had a columnar texture with a representative value of longitudinal length of 19 μm, a representative value of short-side length of 2.0 μm, and a thickness uniformity of 0.66, where the porosity was 56%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 2.18, the maximum Raman orientation parameter M was 2.56, the minimum Raman orientation parameter m was 1.29, and M/m was 2.0. The structure and performances of the porous hollow-fiber membrane after stretching are shown in Table 1.

Example 7

A raw material solution was obtained in the same manner as in Example 5 except that the concentration of the vinylidene fluoride homopolymer was changed to 42 wt %. Tc of the raw material solution was 35° C.

The raw material solution was pressurized in the same manner as in Example 5 and then discharged. The raw material solution discharged was allowed to stay in a first cooling bath at a temperature of −3° C. containing an aqueous 85 wt % dimethylsulfoxide solution for 10 seconds, further allowed to stay in a second cooling bath at a temperature of 20° C. containing an aqueous 85 wt % dimethylsulfoxide solution for 50 seconds, and thereby solidified. The obtained porous hollow-fiber had a columnar texture with a thickness uniformity of 0.72, where the occupancy of columnar texture was 95% and the occupancy of spherical texture was 5%.

The porous hollow-fiber obtained above was then stretched to 2.4 times at a stretching speed of 125%/s in water at 95° C. The porous hollow-fiber membrane after stretching had a columnar texture with a representative value of longitudinal length of 22 μm, a representative value of short-side length of 1.8 μm, and a thickness uniformity of 0.70, where the porosity was 56%, the orientation degree π of the molecular chain of vinylidene fluoride homopolymer in the longitudinal direction of the porous hollow-fiber membrane was 0.34, the Raman orientation parameter ν was 2.96, the maximum Raman orientation parameter M was 3.31, the minimum Raman orientation parameter m was 1.42, and M/m was 2.3. The structure and performances of the porous hollow-fiber membrane after stretching are shown in Table 1.

Example 8

A raw material solution was obtained in the same manner as in Example 5 except that the concentration of the vinylidene fluoride homopolymer was changed to 42 wt %. Tc of the raw material solution was 35° C.

The raw material solution was pressurized in the same manner as in Example 5 and then discharged. The raw material solution discharged was allowed to stay in a first cooling bath at a temperature of −3° C. containing an aqueous 85 wt % dimethylsulfoxide solution for 10 seconds, further allowed to stay in a second cooling bath at a temperature of 20° C. containing an aqueous 85 wt % dimethylsulfoxide solution for 50 seconds, and thereby solidified.

The obtained porous hollow-fiber had a columnar texture with a thickness uniformity of 0.72, where the occupancy of columnar texture was 95% and the occupancy of spherical texture was 5%.

The porous hollow-fiber obtained above was then stretched to 2.4 times at a stretching speed of 16%/s in water at 95° C.

The porous hollow-fiber membrane after stretching had a columnar texture with a representative value of longitudinal length of 23 μm, a representative value of short-side length of 1.9 μm, and a thickness uniformity of 0.72, where the porosity was 55%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 2.48, the maximum Raman orientation parameter M was 2.75, the minimum Raman orientation parameter m was 1.33, and M/m was 2.1. The structure and performances of the porous hollow-fiber membrane after stretching are shown in Table 1.

Comparative Example 1

A raw material solution was prepared in the same manner as in Example 1. The raw material solution was retained at 99 to 101° C. for 15 seconds under a pressure of 2.5 MPa applied by means of the same apparatus as in Example 1. Thereafter, the raw material solution was discharged from the spinneret in the same manner as in Example 1. The raw material solution discharged was allowed to stay in a cooling bath at a temperature of 5° C. containing an aqueous 85 wt % γ-butyrolactone solution for 20 seconds and thereby solidified.

The obtained porous hollow-fiber had a columnar texture with a thickness uniformity of 0.42, where the occupancy of columnar texture was 90% and the occupancy of spherical structure was 10%.

The porous hollow-fiber obtained above was then stretched to 1.5 times at a stretching speed of 44%/s in water at 95° C.

The porous hollow-fiber membrane after stretching had a columnar texture with a representative value of longitudinal length of 12 μm, a representative value of short-side length of 2.2 μm, and a thickness uniformity of 0.39, where the porosity was 56%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 1.01, the maximum Raman orientation parameter M was 1.03, the minimum Raman orientation parameter m was 1.00, and M/m was 1.0. The structure and performances of the porous hollow-fiber membrane after stretching are shown in Table 2.

Comparative Example 2

A raw material solution was prepared in the same manner as in Example 1 except that the concentration of the vinylidene fluoride homopolymer was changed to 39 wt %. Tc of the vinylidene fluoride homopolymer solution was 52° C.

The raw material solution was retained at 99 to 101° C. for 15 seconds under a pressure of 2.5 MPa applied by means of the same apparatus as in Example 1 and thereafter, the raw material solution was discharged in the same manner as in Example 1. The raw material solution discharged was allowed to stay in a first cooling bath at a temperature of 5° C. containing an aqueous 85 wt % γ-butyrolactone solution for 10 seconds, further allowed to stay in a second cooling bath at a temperature of 30° C. containing an aqueous 85 wt % γ-butyrolactone solution for 40 seconds, and thereby solidified. The obtained porous hollow-fiber had a columnar texture with a thickness uniformity of 0.69, where the occupancy of columnar texture was 91% and the occupancy of spherical texture was 9%.

The porous hollow-fiber obtained above was then stretched to 3.0 times at a stretching speed of 44%/s in water at 95° C.

The porous hollow-fiber membrane after stretching had a columnar texture with a representative value of longitudinal length of 19 μm, a representative value of short-side length of 1.8 μm, and a thickness uniformity of 0.60, where the porosity was 60%, the orientation degree π of the molecular chain of vinylidene fluoride homopolymer in the longitudinal direction of the porous hollow-fiber membrane was 0.86, the Raman orientation parameter ν was 4.35, the maximum Raman orientation parameter M was 7.90, the minimum Raman orientation parameter m was 1.59, and M/m was 5.0.

The structure and performances of the porous hollow-fiber membrane after stretching are shown in Table 2. The strength of the obtained hollow-fiber membrane was increased due to stretching and orientation, but the membrane was one having low water permeability and elongation and high Young's modulus.

The hollow-fiber membrane obtained was cut into 30 cm, immersed in water filling a cylindrical vessel of 10 cm (diameter)×50 cm (length), and exposed to air for 1 minute under the conditions of an air flow rate of 10 L/min and 25° C., as a result, fiber breakage occurred.

Comparative Example 3

A raw material solution was prepared in the same manner as in Example 1 except that the concentration of the vinylidene fluoride homopolymer was changed to 36 wt %. Tc of the raw material solution was 48° C.

The raw material solution was retained at 99 to 101° C. for 20 seconds under a pressure of 2.5 MPa applied by means of the same apparatus as in Example 1 and thereafter, the raw material solution was discharged from the double tube-type spinneret in the same manner as in Example 1. The raw material solution discharged was allowed to stay in a first cooling bath at a temperature of 5° C. containing an aqueous 85 wt % γ-butyrolactone solution for 20 seconds, further allowed to stay in a second cooling bath at a temperature of 20° C. containing an aqueous 85 wt % γ-butyrolactone solution for 20 seconds, and thereby solidified.

The obtained porous hollow-fiber had a columnar texture with a thickness uniformity of 0.66, where the occupancy of columnar texture was 91% and the occupancy of spherical structure was 9%.

The porous hollow-fiber obtained above was then stretched to 2.4 times at a stretching speed of 175%/s in water at 95° C., as a result, fiber breakage occurred, making it impossible to stretch the membrane.

Comparative Example 4

38 wt % of a vinylidene fluoride homopolymer (KF1300, produced by Kureha Corporation, weight average molecular weight: 417,000, number average molecular weight: 221,000) having a weight average molecular weight of 417,000 and 62 wt % of dimethylsulfoxide were dissolved at 130° C. Tc of the thus-obtained vinylidene fluoride homopolymer solution (i.e., raw material solution) was 29° C.

The raw material solution was retained at 64 to 66° C. for 20 seconds under a pressure of 0.2 MPa applied by means of the same apparatus as in Example 1. Thereafter, while discharging an aqueous 90 wt % dimethylsulfoxide solution through the inner tube of the double tube-type spinneret, the raw material solution was discharged through the outer tube. The raw material solution discharged was allowed to stay in a cooling bath at a temperature of −3° C. containing an aqueous 85 wt % dimethylsulfoxide solution for 20 seconds and thereby solidified.

The obtained porous hollow-fiber had a columnar texture with a thickness uniformity of 0.44, where the occupancy of columnar texture was 25% and the occupancy of spherical structure was 75%.

The porous hollow-fiber obtained above was then stretched to 1.5 times at a stretching speed of 16%/s in water at 95° C.

The porous hollow-fiber membrane after stretching had a columnar texture with a representative value of longitudinal length of 14 μm, a representative value of short-side length of 2.1 μm, and a thickness uniformity of 0.42, where the porosity was 59%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 1.03, the maximum Raman orientation parameter M was 1.08, the minimum Raman orientation parameter m was 1.01, and M/m was 1.1. The structure and performances of the porous hollow-fiber membrane after stretching are shown in Table 2.

Comparative Example 5

38 wt % of a vinylidene fluoride homopolymer (KF1300, produced by Kureha Corporation, weight average molecular weight: 417,000, number average molecular weight: 221,000) having a weight average molecular weight of 417,000 and 62 wt % of dimethylsulfoxide were dissolved at 130° C. Tc of the thus-obtained vinylidene fluoride homopolymer solution (i.e., raw material solution) was 29° C.

The raw material solution was retained at 78 to 80° C. for 20 seconds under a pressure of 2.5 MPa applied by means of the same apparatus as in Example 1. Thereafter, while discharging an aqueous 90 wt % dimethylsulfoxide solution through the inner tube of the double tube-type spinneret, the raw material solution was discharged through the outer tube. The raw material solution discharged was allowed to stay in a first cooling bath at a temperature of −3° C. containing an aqueous 85 wt % dimethylsulfoxide solution for 10 seconds, further allowed to stay in a second cooling bath at a temperature of 20° C. containing an aqueous 85 wt % dimethylsulfoxide solution for 30 seconds, and thereby solidified.

The obtained porous hollow-fiber had a columnar texture with a thickness uniformity of 0.68, where the occupancy of columnar texture was 93% and the occupancy of spherical structure was 7%.

The porous hollow-fiber obtained above was then stretched to 1.5 times at a stretching speed of 44%/s in water at 95° C.

The porous hollow-fiber membrane after stretching had a columnar texture with a representative value of longitudinal length of 17 μm, a representative value of short-side length of 2.0 μm, and a thickness uniformity of 0.68, where the porosity was 58%, the orientation degree π of the molecular chain of vinylidene fluoride homopolymer in the longitudinal direction of the porous hollow-fiber membrane could not be calculated, that is, the molecular chain was non-oriented, the Raman orientation parameter ν was 1.01, the maximum Raman orientation parameter M was 1.05, the minimum Raman orientation parameter m was 1.01, and M/m was 1.0. The structure and performances of the porous hollow-fiber membrane after stretching are shown in Table 2.

TABLE 1

| | | Example 1 | Example 2 | Example 3 | Example 4 | Example 5 | Example 6 | Example 7 | Example 8 |
|---|---|---|---|---|---|---|---|---|---|
| Before stretching | Fluororesin-based polymer concentration | 35 | 36 | 39 | 39 | 38 | 38 | 42 | 42 |
| | Kind of solvent | γ-butyrolactone | | | | dimethylsulfoxide | | | |
| | Crystallization temperature Tc (° C.) | 46 | 48 | 52 | 52 | 29 | 29 | 35 | 35 |
| | First cooling bath temperature (° C.) | 20 | 10 | 5 | 5 | 20 | −3 | −3 | −3 |

TABLE 1-continued

|  |  | Example 1 | Example 2 | Example 3 | Example 4 | Example 5 | Example 6 | Example 7 | Example 8 |
|---|---|---|---|---|---|---|---|---|---|
|  | First cooling bath time (sec) | 20 | 10 | 10 | 10 | 20 | 10 | 10 | 10 |
|  | Second cooling bath temperature (° C.) | — | 20 | 30 | 35 | — | 20 | 20 | 20 |
|  | Second cooling bath time (sec) | — | 20 | 40 | 50 | — | 30 | 50 | 50 |
|  | Thickness uniformity (−) | 0.55 | 0.64 | 0.69 | 0.68 | 0.62 | 0.68 | 0.72 | 0.72 |
|  | Spherical structure occupancy (%) | 15 | 13 | 9 | 8 | 6 | 7 | 5 | 5 |
| After stretching | Stretch ratio (times) | 2.0 | 2.4 | 2.4 | 1.8 | 2.0 | 1.8 | 2.4 | 2.4 |
|  | Stretching speed (%/s) | 9 | 44 | 142 | 2 | 19 | 146 | 125 | 16 |
|  | Orientation degree π | non-oriented | 0.25 | 0.31 | non-oriented | non-oriented | non-oriented | 0.34 | non-oriented |
|  | Raman orientation parameter ν | 1.82 | 2.35 | 2.53 | 2.13 | 2.32 | 2.18 | 2.96 | 2.48 |
|  | Maximum Raman orientation parameter M | 2.31 | 2.84 | 3.08 | 2.69 | 2.61 | 2.56 | 3.31 | 2.75 |
|  | Minimum Raman orientation parameter m | 1.32 | 1.21 | 1.14 | 1.65 | 1.42 | 1.29 | 1.42 | 1.33 |
|  | M/m | 1.8 | 2.4 | 2.7 | 1.6 | 1.8 | 2.0 | 2.3 | 2.1 |
|  | Thickness uniformity (−) | 0.51 | 0.60 | 0.62 | 0.66 | 0.61 | 0.66 | 0.70 | 0.72 |
|  | Porosity (%) | 56 | 55 | 54 | 53 | 57 | 56 | 56 | 55 |
| Performance | Pure-water permeation performance ($m^3/m^2/h$) | 1.0 | 2.0 | 1.6 | 0.7 | 1.7 | 0.8 | 2.2 | 2.1 |
|  | Breaking strength (MPa) | 26 | 26 | 35 | 27 | 28 | 31 | 29 | 33 |
|  | Young's modulus (GPa) | 0.26 | 0.22 | 0.24 | 0.28 | 0.30 | 0.31 | 0.35 | 0.32 |
|  | Elongation at break (%) | 245 | 113 | 101 | 262 | 157 | 208 | 125 | 194 |

TABLE 2

|  |  | Comparative Example 1 | Comparative Example 2 | Comparative Example 3 | Comparative Example 4 | Comparative Example 5 |
|---|---|---|---|---|---|---|
| Before stretching | Fluororesin-based polymer concentration | 35 | 39 | 36 | 38 | 38 |
|  | Kind of solvent | γ-butyrolactone | γ-butyrolactone | γ-butyrolactone | dimethylsulfoxide | dimethylsulfoxide |
|  | Crystallization temperature Tc (° C.) | 46 | 52 | 48 | 29 | 29 |
|  | First cooling bath temperature (° C.) | 5 | 5 | 5 | −3 | −3 |
|  | First cooling bath time (sec) | 20 | 10 | 20 | 20 | 10 |
|  | Second cooling bath temperature (° C.) | — | 30 | 20 | — | 20 |
|  | Second cooling bath time (sec) | — | 40 | 20 | — | 30 |
|  | Thickness uniformity (−) | 0.42 | 0.69 | 0.66 | 0.44 | 0.68 |
|  | Spherical structure occupancy (%) | 10 | 9 | 9 | 75 | 7 |
| After stretching | Stretch ratio (times) | 1.5 | 3.0 | 2.4 | 1.5 | 1.5 |
|  | Stretching speed (%/s) | 44 | 44 | 175 | 16 | 44 |
|  | Orientation degree π | non-oriented | 0.86 | fiber breakage | non-oriented | non-oriented |
|  | Raman orientation parameter ν | 1.01 | 4.35 |  | 1.03 | 1.01 |
|  | Maximum Raman orientation parameter M | 1.03 | 7.90 |  | 1.08 | 1.05 |
|  | Minimum Raman orientation parameter m | 1.00 | 1.59 |  | 1.01 | 1.01 |
|  | M/m | 1.0 | 5.0 |  | 1.1 | 1.0 |
|  | Thickness uniformity (−) | 0.39 | 0.60 |  | 0.42 | 0.68 |
|  | Porosity (%) | 56 | 60 |  | 59 | 58 |
| Performance | Pure-water permeation performance ($m^3/m^2/h$) | 1.0 | 0.4 |  | 1.1 | 0.7 |
|  | Breaking strength (MPa) | 11 | 52 |  | 12 | 20 |
|  | Young's modulus (GPa) | 0.16 | 0.42 |  | 0.15 | 0.19 |
|  | Elongation at break (%) | 190 | 45 |  | 120 | 214 |

While the present invention has been described in detail and with reference to specific embodiments thereof, it will be apparent to one skilled in the art that various changes and modifications can be made therein without departing from the spirit and scope of the present invention. This application is based on Japanese Patent Application (Patent Application No. 2016-108319) filed on May 31, 2016, the contents of which are incorporated herein by way of reference.

INDUSTRIAL APPLICABILITY

According to the present invention, a porous hollow-fiber membrane having excellent chemical durability due to a fluororesin-based polymer with high chemical resistance and at the same time, having both excellent physical durability and high pure-water permeation performance is provided. This makes it possible to, in the application to a water treatment field, stably perform filtration for a long period of time while performing chemical cleaning.

The invention claimed is:

1. A porous hollow-fiber membrane comprising a fluororesin-based polymer, wherein
the porous hollow-fiber membrane has a columnar texture oriented in a longitudinal direction thereof, a molecular chain in the columnar texture is oriented in the longitudinal direction of the porous hollow-fiber membrane, and the molecular chain has an average value v of a Raman orientation parameter being from 1.5 to 4.0:

Raman orientation parameter =(I1270/I840) parallel/ (I1270/I840) perpendicular   (1), wherein parallel condition: the longitudinal direction of the porous hollow-fiber membrane is parallel to a polarization direction;

perpendicular condition: the longitudinal direction of the porous hollow-fiber membrane is orthogonal to the polarization direction;

I1270 parallel: the intensity of Raman band at 1,270 $cm^{-1}$ under the parallel condition;

I1270 perpendicular: the intensity of Raman band at 1,270 $cm^{-1}$ under the perpendicular condition;

I840 parallel: the intensity of Raman band at 840 $cm^{-1}$ under the parallel condition; and I840 perpendicular: the intensity of Raman band at 840 $cm^{-1}$ under the perpendicular condition.

2. The porous hollow-fiber membrane according to claim 1, wherein the columnar texture has a short-side length of from 0.5 to 3 μm and an aspect ratio of 3 or more.

3. The porous hollow-fiber membrane according to claim 1, wherein a thickness uniformity of the columnar texture is 0.50 or more.

4. The porous hollow-fiber membrane according to claim 1, wherein the molecular chain in the columnar texture has a ratio M/m of a maximum Raman orientation parameter M to a minimum Raman orientation parameter m being from 1.5 to 4.0.

5. The porous hollow-fiber membrane according to claim 1, having a maximum Raman orientation parameter M of the molecular chain in the columnar texture being 4.0 or less.

6. The porous hollow-fiber membrane according to claim 1, having a porosity being from 40 to 80%.

7. The porous hollow-fiber membrane according to claim 1, having a pure-water permeation performance at 50 kPa and 25° C. being 0.7 $m^3/m^2$/hr or more, a breaking strength being 23 MPa or more, and a Young's modulus being from 0.15 to 0.40 GPa.

8. The porous hollow-fiber membrane according to claim 1, wherein the molecular chain of the fluororesin-based polymer has an orientation degree π in the longitudinal direction of the porous hollow-fiber membrane, calculated based on the following formula (2), being less than 0.4, or the molecular chain of the fluororesin-based polymer is non-oriented:

Orientation degree π=(180°−$H$)/180°   (2), wherein (H is a half-width)(° of a diffraction intensity distribution in a circumferential direction of a wide-angle X-ray diffraction) image.

9. A method for producing a porous hollow-fiber membrane according to claim 1, comprising the following steps 1) and 2):

1) a step of forming a porous hollow fiber having a columnar texture from a membrane-forming solution containing a fluororesin-based polymer by thermally induced phase separation, wherein the columnar texture is oriented in a longitudinal direction and has a thickness uniformity of 0.50 or more and less than 1.00; and 2) a step of stretching the porous hollow fiber obtained in 1) above to 1.8 to 2.4 times in the longitudinal direction at a rate of 1 to 150%/s.

10. The method for producing a porous hollow-fiber membrane according to claim 9, wherein the thermally induced phase separation of the step 1) includes at least one cooling step of the following a) and b):

a) a step of soaking the membrane-forming solution in a cooling bath at a temperature Tb satisfying Tc−30° C.<Tb≤Tc; and b) a step of soaking the membrane-forming solution in a cooling bath at a temperature Tb1 satisfying Tb1≤Tc−30° C., followed by soaking in a cooling bath at a temperature Tb2 satisfying Tc−30° C.<Tb2≤Tc, wherein Tc is a crystallization temperature of the membrane-forming solution containing the fluororesin-based polymer.

\* \* \* \* \*